United States Patent [19]
Spatz et al.

[11] 3,756,408
[45] Sept. 4, 1973

[54] SEPARATION SYSTEM
[75] Inventors: Donald Dean Spatz; Arnold A. Nieland, both of Minnetonka, Minn.
[73] Assignee: Osmonics, Inc., Minneapolis, Minn.
[22] Filed: June 15, 1972
[21] Appl. No.: 263,186

[52] U.S. Cl. .................................. 210/96, 210/321
[51] Int. Cl. ............................................ B01d 31/00
[58] Field of Search ............................. 210/96, 321

[56] References Cited
UNITED STATES PATENTS

| | | | |
|---|---|---|---|
| 3,355,382 | 11/1967 | Huntington | 210/321 X |
| 3,144,029 | 8/1964 | Strandberg, Jr. | 210/46 X |
| 3,462,362 | 8/1969 | Kollsman | 210/23 |
| 3,506,126 | 4/1970 | Serfass et al. | 210/96 |

*Primary Examiner*—Frank A. Spear, Jr.
*Attorney*—Frederick E. Lange et al.

[57] ABSTRACT

An improved separation system for reclaiming pollutant material from a waste or rinse solution including a solvent separating means and a concentrate valve and valve control means for controlling the removal of concentrate from the system and maintaining the concentration of the concentrate solution relatively constant despite a varying feed concentration.

7 Claims, 1 Drawing Figure

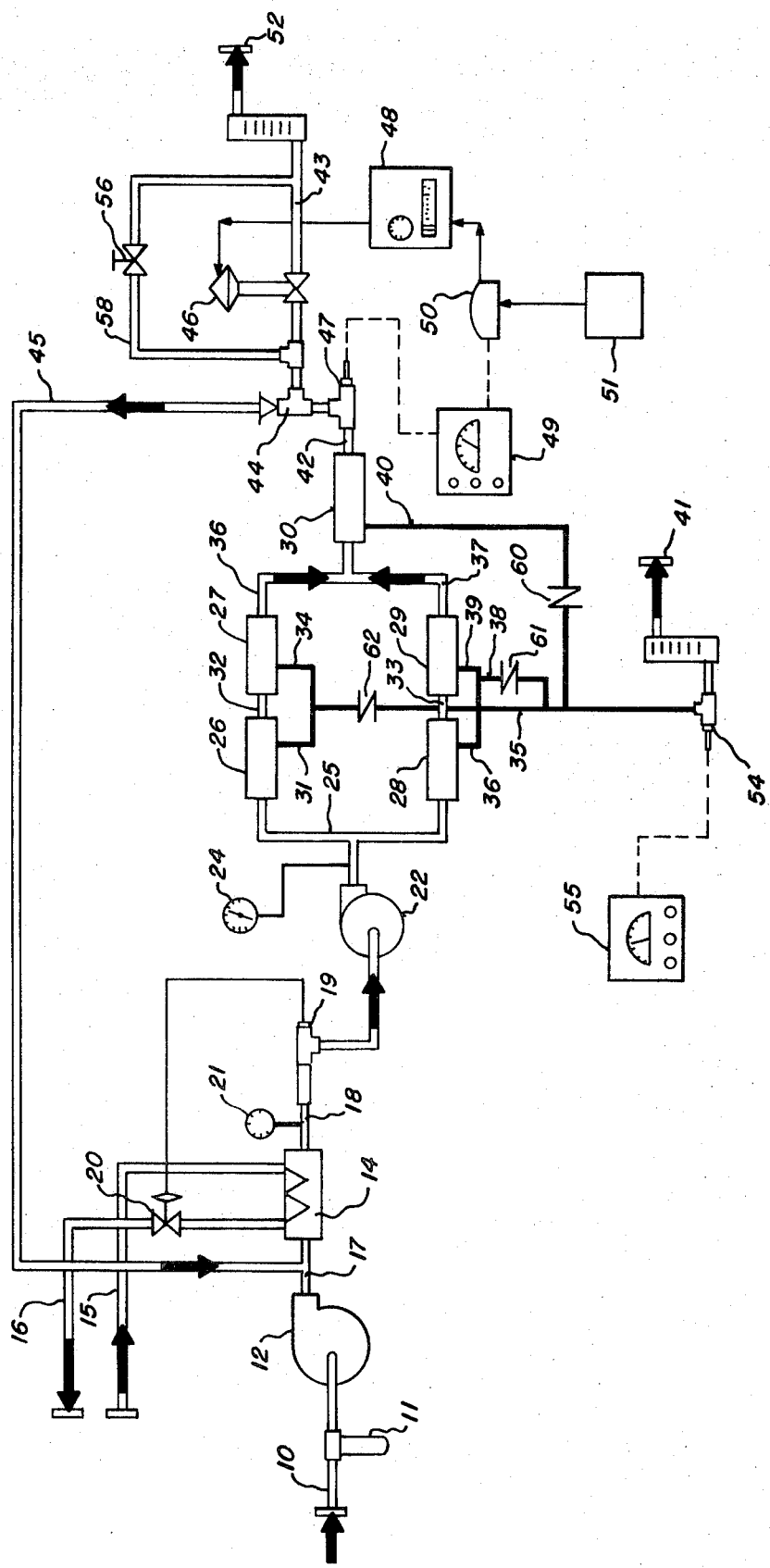

SEPARATION SYSTEM

BACKGROUND OF THE INVENTION

The present invention relates generally to the field of solvent separation equipment and more specifically to an improved separation system for treating waste solutions which is designed to produce an output solution having a relatively constant solute concentration from a feed solution having a variable solute concentration.

There are many firms today which face serious pollution control problems as a result of their current sewering of waste products and rinse solutions from their manufacturing processes. For example, there are many chemical processing and manufacturing firms which are confronted with a biochemical oxygen demand (B.O.D.) pollution control problem. Because of the rising pollution control standards, these firms are finding it necessary to dispose of these waste products and rinse solutions in a manner other than sewering them or dumping them in rivers and lakes.

One solution to the problem which these firms are facing is to reclaim the high B.O.D. compound from the waste and rinse solutions prior to sewering. At the present time, however, an acceptable method of reclaiming these materials has not been accomplished. The situation is further complicated by the fact that it is not uncommon for the concentration of the high B.O.D. compound in a waste or rinse solution to vary by a factor of 10–20 during a normal work day and by the fact that a successful reclamation system requires the solution containing the reclaimed material to have a relatively constant concentration of reclaimed material. Consequently there is a real need for a separation system capable of reclaiming a material such as a high B.O.D. compound from a waste solution and further capable of performing this reclamation despite the variable concentration of the waste solution.

SUMMARY OF THE INVENTION

In contrast to prior attempts, the inventors of the present invention have developed a unique and successful separation system designed to remove or reclaim pollutants from a waste or rinse solution containing a varying concentration of pollutants.

More specifically, the present invention contemplates the use of a semi-permeable membrane system or reverse osmosis system to remove the high pollutant material from the waste solution. This system is unique in that it takes into account the variable feed concentration and the desire and requirement for a relatively constant concentrate concentration. It should be noted that in a reverse osmosis system the solution entering the system is the "feed", the solution permeating the membrane is the "permeate", and the solution remaining over the membrane and having been enriched in solute is the "concentrate". In the past, reverse osmosis systems have been preset, either at a factory or periodically in the field by the operator, to remove a certain percentage of the feed as permeate. Since the feed solution concentration in these prior systems was relatively constant, the concentrate concentration was similarly constant. However, with a variable feed such as might be encountered with one of the above mentioned processes, a conventional reverse osmosis system could not be adequately controlled to produce an acceptable concentrate, even with a full time operator.

Because of the large change in feed concentration of a typical waste or rinse solution, a conventional reverse osmosis system would be upset, possibly causing precipitation within the system as well as upsetting the chemical process of the user. To solve this problem, the inventors have developed a unique feedback loop and control system together with a concentration sensor to linearly control the valve removing the concentrate from the system in response to the changing feed concentration. Accordingly, if the concentration of the feed solution increases by a factor of ten, the concentrate valve will react to remove ten times more concentrate solution to maintain the concentration of the concentrate at a relatively constant value. Because of the sensitivity of this new system to slight changes in the concentrate concentration, the inventors use a valve capable of controlling the concentrate flow within 0.05 gallons per minute.

Accordingly, it is an object of the present invention to provide an improved separation system capable of reclaiming pollutant materials from a waste or rinse solution.

Another object of the present invention is to provide an improved separation system capable of producing a relatively constant reclaimed material concentration from a variable feed concentration.

Another object of the present invention is to provide an improved separation system including a semipermeable membrane and a unique feedback and control means for producing a solution of relatively constant concentration from a feed solution having a variable concentration.

These and other objects and advantages of the present invention will become apparent with reference to the drawings, the description of the preferred embodiment and to the appended claims.

DESCRIPTION OF THE DRAWINGS

The FIGURE of the present invention is a schematic flow diagram of the improved separation system.

DESCRIPTION OF THE PREFERRED EMBODIMENT

The preferred embodiment of the present invention includes a reverse osmosis system embodying a unique linear feedback control system and a concentrate control valve for producing a concentrate solution having a relatively constant solute concentration from a feed solution having a variable solute concentration. For purposes of the description of the preferred embodiment a solution which enters the system will be referred to as the "feed", the solution permeating the membrane will be referred to as the "permeate", and the solution which remains above the semipermeable membrane will be referred to as the "concentrate".

With reference to the drawing, the feed solution, which may be a waste or rinse solution from an industrial process enters the system at the feed inlet 10. The feed solution may contain a variety of pollutant materials such as compounds having a relatively high biochemical oxygen demand (B.O.D.) or high toxicity and will often be at a relatively high temperature. The concentration of the pollutant material in the feed for the system of the present invention may vary from 0.1 percent to as high as 2 percent by weight. Immediately downstream from the feed inlet 10 is a prefilter 11 which is installed to protect the hereinafter described membrane modules and valves from particles which may be in the feed solution. Although the prefilter 11 may have various characteristics, the prefilter of the present invention includes s stainless steel 200 mesh screen. It should be noted that the prefilter 11 must be checked periodically to insure that a sufficient supply of water is available to the system pumps. If the filter 11 becomes plugged for any reason, the life of the pumps and the entire system may be greatly reduced.

After passing through the prefilter 11, the feed solution is pressurized by the pump 12 which forces the feed solution through the heat exchanger 14. The pump 12 is a staged centrifugal pump similar to a standard deep-well pump. The pump 12 is driven by a two horsepower, 3450 rpm, 60 hz, 3 phase 230/460 volt motor. The heat exchanger 14 includes a coolant inlet 15 and a coolant outlet 16. The purpose of the heat exchanger is to reduce the temperature of the feed solution to a temperature which will not damage the membrane modules and other components of the system. Following its passage through the exchanger 14, the feed passes through the conduit 18 and is exposed to a temperature valve bulb 19 which senses the temperature of the feed solution flowing from the heat exchanger 14. The temperature sensor 19 is in turn connected to the temperature control valve 20 disposed in the coolant outlet line 16 for controlling the temperature of the feed solution. For example, if the temperature of the solution coming from the heat exchanger 14 increases beyond a predetermined level, the valve 20 will open, thus causing more cooling water to flow through the heat exchanger 14. If the temperature of the solution exiting from the heat exchanger 14 is lower than a predetermined level, the valve 20 will close, thus reducing the amount of cooling water passing to and through the heat exchanger 14. A conventional pressure gauge 21 is positioned in the conduit 18 between the heat exchanger 14 and the tempeature bulb 19 to indicate the pressure of the solution.

From the heat exchanger 14, the solution flows into a second centrifugal pump 22 which operates to raise the pressure of the feed solution to the operating pressure of the reverse osmosis membranes which, in the preferred embodiment, is approximately 500 psig plus line pressure. The pressure of the feed solution prior to entering the modules is indicated on the pressure gauge 24 which may be mounted on the instrument panel of the system.

As can be seen, the feed solution then passes through the conduit 25 into a series of semipermeable membrane modules which are placed in pressure vessels. In the preferred embodiment there are five such pressure vessels indicated by the reference numerals 26–30. Although a variety of different types of modules may be used, the modules used in the preferred embodiment are OSMO 334–89 membrane modules manufactured by Osmonics, Inc. of Minneapolis, Min.

The pressure vessels 26–30 are arranged so that a portion of the feed solution flows through the conduit 25 into the pressure vessel 26, and a portion flows through the conduit 25 into the pressure vessel 28. In each of pressure vessels 26 and 28, the feed solution is exposed to one side of a semipermeable membrane and, because it is under pressure, a portion of the feed is caused to permeate the membrane and flow from the pressure vessels 26 and 28 via the conduits 31 and 36 respectively. The portion of the feed solution which does not permeate the membranes, flows from the pressure vessels 26 and 28 via the conduits 32 and 33 and into the pressure vessels 27 and 29 respectively. The solution which permeates the membrane of the pressure vessel 27 exits through the conduit 34 and is directed, together with the permeate from the pressure vessel 26, to the permeate outlet 41 via the conduit 35. The portion of the solution not permeating the membrane of the pressure vessel 27 flows through the conduit 36 to the pressure vessel 30.

Similarly, the solution permeating the membrane of the pressure vessel 29 exits through the conduit 39 and is directed, together with the premeate from the pressure vessel 28, via the conduits 38 and 35, to the permeate outlet 41. The solution not permeating the membrane of the pressure vessel 29 passes through the conduit 37 into the pressure vessel 30. Of the solution entering the pressure vessel 30 from the conduits 36 and 37, a portion permeates the membrane of that pressure vessel and is conducted via the conduit 40 to the conduit 35 and finally to the permeate outlet 41. The solution not permeating the membrane of the pressure vessel 30 is directed from that pressure vessel by the conduit 42. It should be noted that each of the conduits 35, 38 and 40 is provided with a check valve 62, 61 and 60 respectively to insure against a back flow of permeate in these conduits.

The portion of the solution which does not permeate the membrane of the pressure vessel 30 flows through the conduit 42 to a tee 44 having one branch directing the concentrate solution into the recycle conduit 45 for direction back t0 the conduit 17 for recirculation through the system and a second branch directing the concentrate toward the concentrate control valve 46. The purpose of the valve 46 is to selectively remove the concentrate solution flowing through the conduit 42 from the system. In the preferred embodiment, the valve 46 is a control valve manufactured by Taylor Instruments Corporation of Rochester, New York, and is identified by Model No. 400VL42330. This valve opens and closes in response to air pressure supplied by a pneumatic amplifier 48 and utilizes a lever which operates a screw mechanism to provide for very small flows. The valve 46 is controlled by a valve control system which includes a concentrate sensor 49, an electro-pneumatic transducer 50, an air supply 51, and a pneumatic signal amplifier 48.

More specifically, the concentrate sensor 49 includes a conductivity cell or probe 47 exposed to the concentrate solution in the conduit 42 and a conductivity monitor which has a 4-20 milli-ampere output signal proportional to the conductivity. Because the conductivity of the solution in the conduit 42 varies with its concentration, the output from the monitor, in milliamperes, will be linearly proportional to the concentration of the concentrate solution in the conduit 42. In the preferred embodiment, the conductivity sensor 49 is manufactured by Beckman Instruments of Cedargrove, N.J., and is identified by Model No. RA5. The 4–20 milli-ampere output from the conductivity monitor 49 then serves as the input to an electro-pneumatic transducer 50 which takes the 4–20 milli-ampere signal and converts it to a 3-15 psi signal from the air source 51.

Because the variance of the solute concentration of the concentrate solution in the conduit 42 is very small with respect to the 4–20 ma scale on the conductivity monitor, the milli-ampere signal-from the conductivity monitor indicating the concentration comprises a very narrow range in the output of the 3-15 psi transducer 50, e.g. 10±1 psi. In order to have high resolution on the concentrate valve controller, the narrow range from the electropneumatic transducer 50 is amplified by the pneumatic signal amplifier 48. The pneumatic amplifier 48 takes the narrow range of 10±1 psi signal from the transducer 50 and amplifies it to a full 3-15 psi range (i.e. 9±6 psi). The full range 3-15 psi output from the amplifier 48 then serves as the input to the control valve 46 for controlling the removal of concentrate solution from the system. Because of the amplification of the narrow range signal of 10±1 psi to a signal of 3-15 psi (i.e. 9±6 psi), the control valve can be sized for high resolution requiring the full travel of the valve to match the 3-15 psi output of the amplifier. In the preferred embodiment, the transducer 50 and the amplifier 48 are manufactured by Taylor Instruments Corporation and are identified by Model Nos. 701TF112 and 442RF1237 respectively.

With the proper calibrations and settings, the conductivity probe 47, the conducivity monitor 49, the transducer 50, the pneumatic amplifier 48 and the control valve 46 will function to maintain the concentration of the concentrate solution exiting through the valve 46 and out through the concentrate outlet 52 relatively constant despite the variance of the feed solution entering through the feed inlet 10. This accomplished as a result of the valve 46 being linearly controlled in proportion to the concentration in the conduit 42 by the members 47, 48, 49 and 50. For example, if the solute concentration in the conduit 42 exceeds the predetermined, desired level, the elements 47-50 function to open the valve 46 in an amount propotional to the extent to which the solute concentration in the conduit 42 exceeds the predetermined level. Whereas, if the solute concentration in the conduit 42 falls below the preselected level, the elements 47-50 function to close the valve 46.

With reference to the drawing, the operation of the separation system of the present invention, assuming that the desired solute concentration of the concentrate being removed from the system through the valve 46 is 20 percent, may be explained as follows: Because the concentration of the feed solution entering the feed inlet 10 is relatively small (from 0.1 to 2 percent), the concentration within the system, on start-up, is at a low level. As this feed solution enters the system, it is cooled by the heat exchanger 14 to the proper temprature and pressurized by the pumps 12 and 22 to a pressure of about 500 psi. This pressurized solution is then introduced into the semipermeable membrane modules in the pressure vessels 26-30. Because the membranes preferentially pass the solvent of the feed solution, the concentration of the solution remaining above the membranes and thus exiting from the pressure vessels through the conduit 42 will begin to increase. On start-up, the concentration of this solution is still at a relatively low level. Consequently, the control elements 47-50 will not open the valve 46. Thus, all of the solution passing through the conduit 42 will be directed into the recycle conduit 45 and recycle back into the system. As more permeate is removed from the system through the permeate outlet 41, the concentration of the solution above the membranes will continue to increase until it reaches a nearly 20 percent concentration level. At a nearly 20 percent concentration level the conductivity sensor 47 sends a signal, via the monitor 49, the transducer 50, and the amplifier 48 causing the control valve 46 to open slightly. As the valve 46 is opened, the concentration of the concentrate solution will decrease. As a result, the conductivity sensor 47 senses the lowering of this concentration and sends an appropriate signal causing the valve 46 to close slightly until it reaches the exact opening where the concentrate will have exactly a 20 percent concentration of solute. Thus, the concentrate control valve 46 is controlled linearly making it possible to obtain the exact concentration of the concentrate making it possible to obtain the exact concentration of the concentrate solution with a minimum of feedback loops.

The valve 46 and valve controlling elements 47-50 must also compensate for the varying feed concentration so that the concentration of the solution being removed from the system and thus the concentration of the solution being recycled through the conduit 45 and existing above the membranes remains relatively constant. For example, if the feed solution contains 1 percent solute, the separation system need only remove or permeate 1/10th of the solvent through its membranes as when the feed concentration was 0.1 percent. This large change in feed concentration would upset a convention reverse osmosis separation system in that it would cause precipitation on the membrane and upset the operator's processing. However, with the unique control means of the present system, the concentrate control valve 46 compensates for this variance in feed concentration by providing a sufficient concentrate flow to maintain the concentrate concentration at 20 percent.

In addition to the elements described, the preferred embodiment of the present system includes several accessories for enabling the operator to check the operation of the system. For example, a conductivity sensor 54 is exposed to the permeate solution in the conduit 35 and is connected with a conductivity meter 55 similar to the monitor 49 for visually indicating the concentration of the permeate solution. With this monitor, the operator can check to see whether the concentration level of the permeate solution is sufficiently low. An additional accessory is the flush valve 56 which is disposed in the conduit 58 and bypasses the control valve 46 for periodically flushing the system to remove any precipitates which may have collected on the membranes.

Although the description of the preferred embodiment has been quite specific, there may be modifications which can be made to the system without deviating from the spirit of the present invention. Consequently, the inventors intend that the scope of the present invention be determined by the appended claims rather than by the description of the preferred embodiment.

We claim:

1. A separation and reclamation system for producing a concentrate solution having a relatively constant solute concentration from a feed solution having a variable solute concentration comprising:

solvent separation means having an inlet for introducing feed solution into said solvent separation means and an outlet for removing concentrate solution from said solvent separating means, said solvent separating means further including a semipermeable membrane for preferentially passing the solvent of the solution in said solvent separation means;

a recycle connected with said outlet for recycling a portion of said concentrate solution through said solvent separation means;

a concentrate valve connected with said outlet for removing a portion of said concentrate solution from said system and for varying the rate at which the concentrate solution is removed from said system, said recycle and said concentrate valve further functioning to maintain sufficient flow through said outlet and over said semipermeable membrane so as to limit precipitation of solids on said membrane; and a valve control means for controlling said concentrate valve including a concentration sensing means for detecting the relative solute concentration of the solution in said outlet between said solvent separation means and said concentrate valve, means for opening said concentrate valve when the solute concentration in said outlet is greater than a preselected value, the extent to which said valve is opened being proportional to the extent to which the solute concentration in said outlet is greater than said preselected value, and for closing said concentrate valve when the solute concentration in said outlet is less than said preselected value.

2. The improved separation system of claim 1 wherein said concentration sensing means includes a conductivity probe.

3. The improved separation system of claim 1 wherein said concentrate valve is opened and closed by air pressure.

4. The improved separation system of claim 3 wherein said valve control means further includes a conductivity monitor electrically connected with said conductivity probe and having an electrical current output proportional to the concentration of the solute in said separating means.

5. The improved separation system of claim 4 wherein said valve control means further includes electro-pneumatic transducer adapted to convert the electrical current signal from said conductivity monitor to a proportional air pressure signal.

6. The improved separation system of claim 5 wherein said valve control means further includes a pneumatic amplifier for amplifying the air pressure signal from said transducer to an air pressure signal capable of opening and closing said concentrate valve.

7. The improved separation system of claim 1 wherein said solvent separation means includes a plurality of reverse osmosis membrane modules.

* * * * *